Jan. 5, 1971  D. E. MacDERMOD  3,552,220
PRECISION INCREMENTAL STEPPING DEVICE
Filed March 19, 1969  3 Sheets-Sheet 1
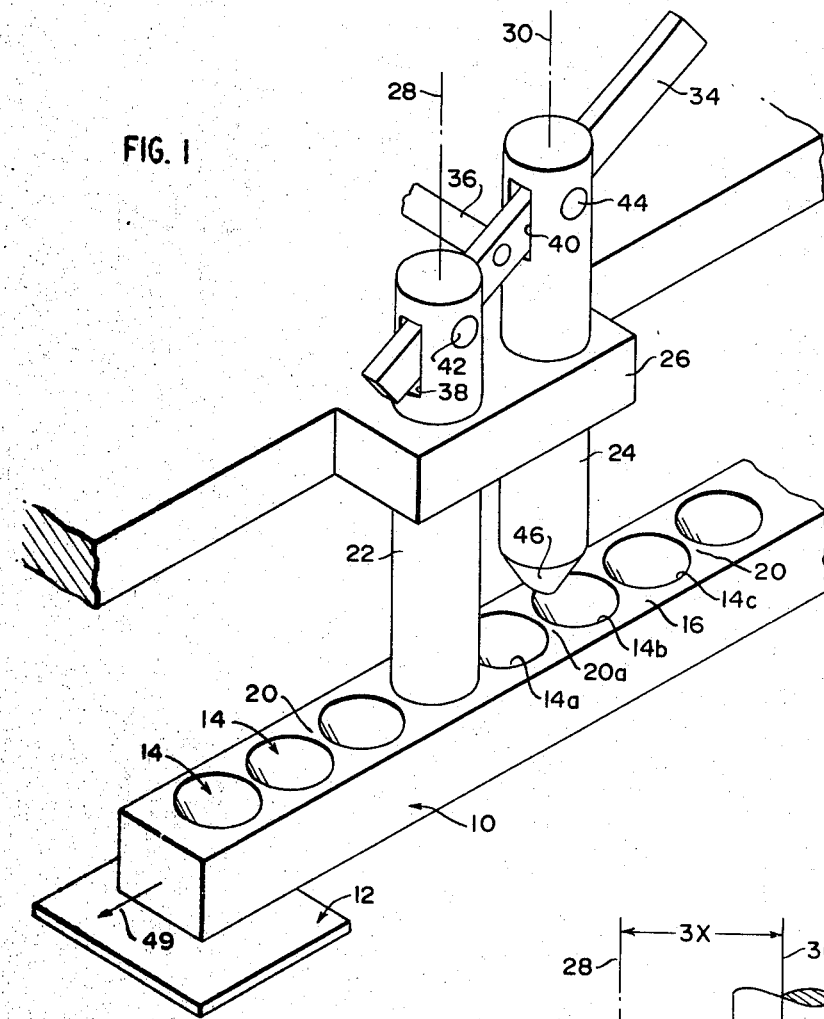
FIG. 1
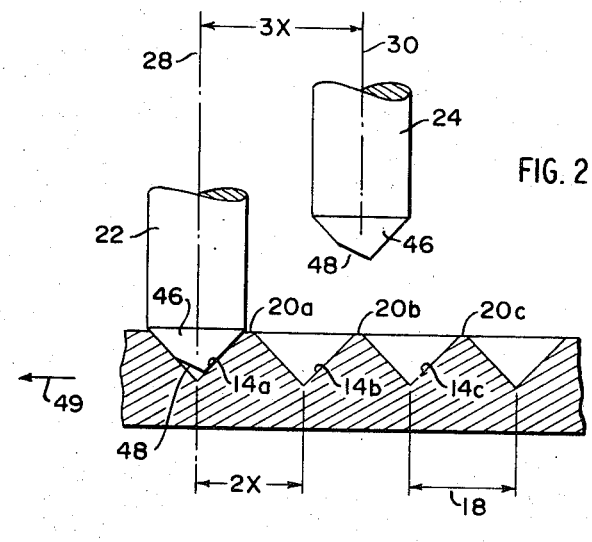
FIG. 2
FIG. 3
INVENTOR.
DONALD E. MacDERMOD
BY
Kenway, Jenney & Hildreth
ATTORNEYS INVENTOR.
DONALD E. MacDERMOD

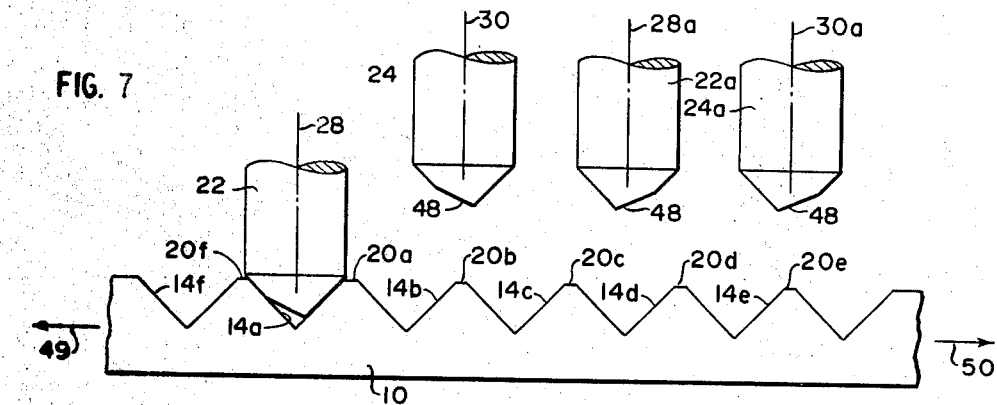
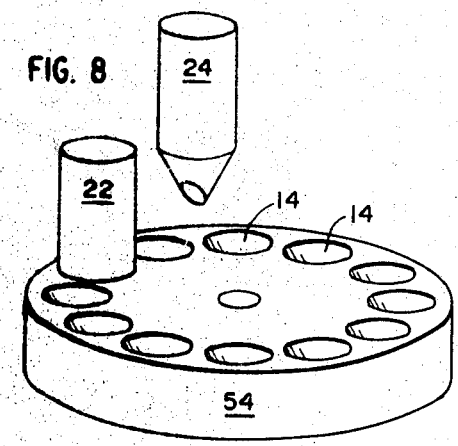
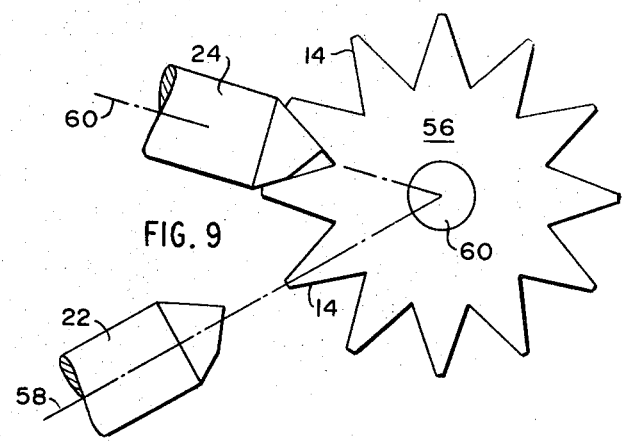
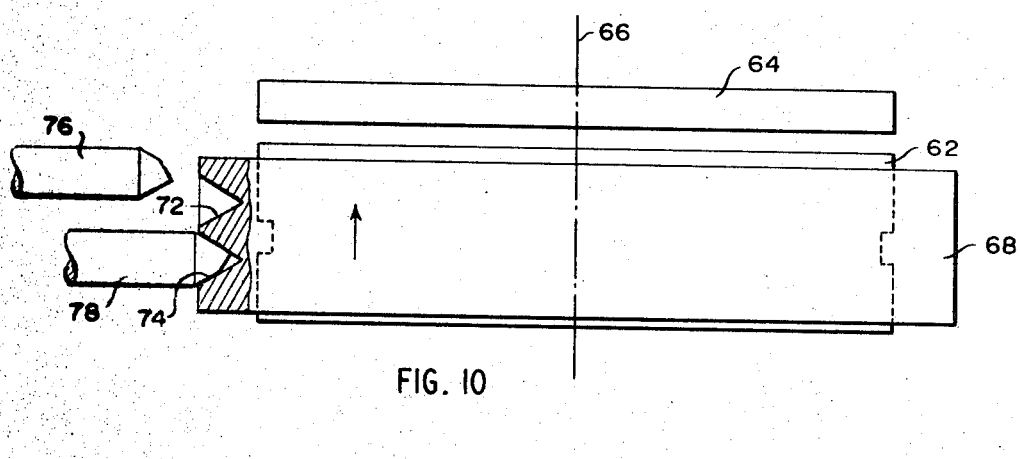

United States Patent Office 3,552,220
Patented Jan. 5, 1971

3,552,220
PRECISION INCREMENTAL STEPPING DEVICE
Donald E. MacDermod, Rowley, Mass., assignor to Teradyne Components, Lowell, Mass., a corporation of Massachusetts
Filed Mar. 19, 1969, Ser. No. 808,412
Int. Cl. F16h 21/54
U.S. Cl. 74—107      18 Claims

ABSTRACT OF THE DISCLOSURE

A precision incremental stepping device including a movable indexing member having a plurality of identical conical depressions formed thereon at spaced regular intervals. A pair of plungers having identical conical ends, complementary to the conical depressions on the indexing member are mounted above the indexing member for alternating movement that is toward and away from the depressions so that as one plunger moves downwardly toward the indexing member the other plunger will move upwardly away from the indexing member. The axes of the plungers are spaced so that when the cone of one plunger is in engagement with a given depression, the cone of the other, remote plunger will be disposed above and in misalignment between a selected pair of depressions. When the position of the plungers is reversed to move the remote plunger downwardly toward the indexing member, the cone of the downwardly moving plunger is guided into a predetermined one of the selected pair of depressions by means of a truncated surface formed on the cone which engages the desired one of the depressions. Downward movement of the plunger is continued until its cone is wedged into and is seated fully, in complementary engagement, in the predetermined depression to cause the indexing member to advance by a predetermined increment.

SUMMARY OF THE INVENTION

My invention relates to indexing devices and particularly to a mechanical device for moving a member along a predetermined path in precise and distinct incremental steps.

Modern manufacturing and production techniques require frequently that a device be employed to sequentially index a machine part or a workpiece at regular and precise intervals and to precise dimensional tolerances. These devices may be employed when the manufacturing procedure requires a drilling, punching, shearing, bending, or notching process of mechanical parts. For example, an indexing device is employed when it is desired to provide or drill a number of regularly spaced holes in a sheet to receive electrical components such as connectors. It may be desirable to perform a number of similar operations on a single member or to provide a single operation on a plurality of members, in which case it is necessary to index precisely the member or members past the stations at which the various operations are to be performed.

A multitude of such sequencing or stepping arrangements has been proposed and utilized in the prior art, such as, for example, arrangements including gears, pulleys, electrical stepping switches, relays, servomotors, clutches, etc. Some of the techniques employed for sequentially indexing a machine part or workpiece require that the operator pay close attention to and visually monitor the operation of the stepping device. For example, a manually operated pantograph machine is employed sometimes in which the operator follows a master pattern causing movement of a table or an operating head which is moved in the desired, sequential steps corresponding to those of the master. It is among the objects of my invention to provide an incremental stepping device which may be operated automatically and which does not require that its operation be monitored continually as when a pantograph machine is employed.

Also among the objects of my invention is to provide an improved precision indexing or incremental stepping device, of the class described which is of extremely simple and basic construction. The device, in accordance with my invention may be operated either by hand or automatically. Additionally, because of its simplicity and relatively few moving parts there is little tendency for my device to malfunction or fail and it thus produces highly reliable and dependable results.

My invention may be employed to index the movement of a part or a member in precise increments whether the movement of that member is linear or rotary.

The invention employs an indexing technique in which a plurality of identical holes or depressions are formed in an indexing member at precise and regular intervals. A pair of drive members or plungers, having ends shaped to complement and fit within the depressions are provided. The plungers are mounted for alternating movement toward and away from the indexing member so that one of the plungers may be in complementary engagement with a selected depression while the other plunger is spaced from the indexing member. The position of the plungers is reversed to urge the remote plunger into engagement with another selected depression on the indexing member. The depressions and plungers are spaced so that the plunger moving toward the indexing member will be displaced from a registered position with the selected depression with which it is intended to be engaged. The surface which defines the depressions and its complementary surface of the plunger are formed to produce a wedging effect which will cause the indexing member to be urged into registry with the selected depression after the downwardly moving plunger has engaged the indexing member and thereafter is forced continually against the indexing member to completely seat the plunger in the selected depression. The plungers and depressions are disposed at intervals so that the movement of the indexing member from the time it is first contacted by the downwardly moving plunger to the time the plunger is fully seated in the selected depression will equal the desired stepping increment.

Other objects and advantages of my invention will be apparent from the following detailed description, in which like reference characters refer to identical parts, and with reference to the accompanying drawings wherein:

FIG. 1 illustrates the essential elements of my device;

FIG. 2 is a side elevation, partly in section of the indexing member and an associated pair of plungers;

FIG. 3 is an illustration of that part of the plunger which engages the indexing member;

FIG. 7 shows an arrangement of plungers for providing stepping increments in variable patterns and sequences;

FIG. 8 illustrates my invention as employed in a rotary stepping device;

FIG. 9 illustrates my invention as incorporated into an alternative rotary stepping device; and FIG. 10 is a somewhat schematic illustration of my invention as used to engage or disengage a clutch with a flywheel.

Figure 4:
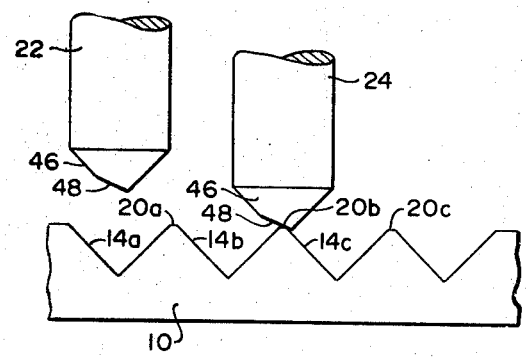
FIG. 4 is a view similar to that of FIG. 2 illustrating the position of the plungers and slide when the downwardly moving plunger first engages the slide.

FIG. 1 shows an embodiment of my invention by which an incremental stepping motion is imparted to an indexing member, such as a slide 10. The indexing member 10 may be supported slidably on a suitable supporting surface 12. Other arrangements may be provided for supporting the indexing member 10 for linear movement in a horizontal plane such as rollers, bearings, etc. The slide 10 may be connected by any convenient means to the machine part or workpiece which is to be indexed. A number of holes or depressions 14 are formed in the upper surface 16 of the slide 10. The depressions may be of a conical shape as shown in FIG. 1 or any other shape which will produce a "wedging" effect in response to downward movement of a drive member against the surface of the depression 14. The depressions 14 are disposed in line along the length of the slide 10 and are spaced at regular and precise intervals, indicated by the arrow 18 in FIG. 2 to provide relatively narrow webs or lands 20 on the upper surface 16 of the slide 10 between adjacent depressions 14. Thus, each pair of adjacent depressions 14 will be separated by a relatively narrow land 20 which are spaced by the increment 18. For reasons which will be apparent below, the dimension 18 is equal to two times the magnitude of the desired stepping increment.

The arrangement for driving the slide 10 includes a pair of drive members or plungers 22 and 24 which are disposed above the slide 10 and are mounted to a suitable, rigid support 26 for movement along the vertical axes 28 and 30, respectively. The axes 28 and 30 are in alignment with the row of depressions 14, the axes 28, 30 being space by a dimension indicated as 3X in FIG. 2. The dimension 3X is equal to three times the desired stepping increment or any other greater, odd multiple of the desired stepping increment. Thus, when the axis 28 of the plunger 22 is in central registry with a selected one of the depressions 14, the axis 30 of the other plunger 24 will intersect the slide directly between a selected pair of adjacent depressions 14 and will be in alignment with the land 20 between that pair of depressions 14 so that the raised, remote plunger 24 will overlap a portion of both depressions 14 of the adjacent pair.

The plungers 22, 24 are mounted to the support 26 for alternating vertical movement that is toward and away from the slide 10 so that as one of the plungers moves upwardly away from the slide 10, the other plunger simultaneously will move downwardly toward and into engagement with the slide 10. Any number of mechanisms may be provided for effecting this alternating movement. FIG. 1 shows a suggested embodiment which includes a lever 34 mounted to the support 26 for pivotal movement about a horizontal axis 26, the axis 36 being located directly between the vertical axes 28, 30. The lever 34 protrudes through slots 38 and 40 formed in the upper ends of the plungers 22, 24, respectively. The lever 34 is connected to the plungers 22, 24 by means of pins 42 and 44 which are disposed within the slots 38, 40 and protrude through slots (not shown) formed on the lever 34. Thus, as the lever 34 is pivoted about the axis 36, one of the plungers will be raised while the other plunger simultaneously will be lowered. The lever 34 may be operated by hand or by automatic controls. Other driving mechanisms will be apparent to those skilled in the art to effect the desired relative movement of the plungers 22 and 24.

As show more clearly in FIGS. 2 and 3, the lower end of each of the plungers 24 has a conical face 46 complementary to the contour of the depressions 14 so that the face 46 may fit snugly wthin each of the depressions 14. Additionally, the tip of the conical face 46 is truncated to define a selector surface 48 which functions in the manner described below.

Figure 5:
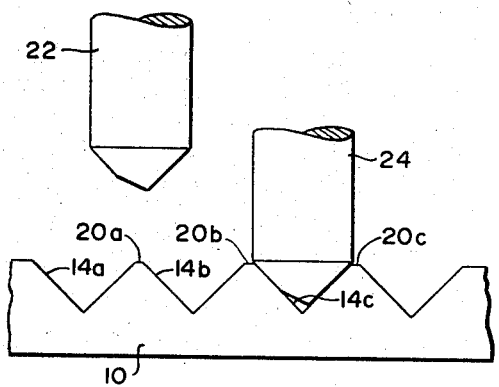
FIG. 5 is a view similar to that of FIGS. 2 and 4 illustrating the position of the plunger and slide when the downwardly moving plunger has become seated fully in a selected depression on the slide.

Assuming that the plunger 22 is in its most downward position in which its conical face 46 is in complementary engagement with a selected depression, such as 14 (see FIG. 2), the raised plunger 24 will be disposed so that its axis 30 intersects the land 20b between the depressions 14b and 14c. As the lever 34, or other drive mechanism, is operated to reverse the positions of the plungers to raise the plunger 22 and lower the plunger 24 downwardly toward the slide 10 the selector surface 48 of the downwardly moving plunger 24 initially will engage the land 20b as shown in FIG. 4. Because of the oblique angle at which the selector surface 48 is oriented, the downwardly moving plunger 24 will not become jammed against the land 20b but will be guided toward the selected depression 14c. It should be noted here that the support 26 for the plungers is sufficient to preclude the plungers from deviating unduly from the vertical axes 28 and 30. Because of this rigid support of the plungers and the freedom of movement permitted the slide 10, continued downward movement of the plunger 24 will cause its conical face 46 to contact the conical surface of the depression 14c to produce the wedging effect by which the slide 10 will be urged horizontally in the desired direction (indicated by the arrow 49) until the axis 30 of the plunger 24 is in registry with the axis of the depression 14c, at which time the conical face 46 of the plunger 24 will be seated fully within the depression 14c as shown in FIG. 5. It will be appreciated from the foregoing that the incremental motion imparted to the slide 10 is equal to precisely one-half the distance between the centers of adjacent depressions 14. Additionally, it should be noted that after the plunger 24 is seated fully within the selected depression 14c, the axis 28 of the plunger 22, which previously had been in alignment with the depression 14a, will now be located in intersecting relation with the land 20a. Thus it will be understood that when the movement of the plungers 22, 24 is reversed again to raise the plunger 24 and urge the plunger 22 downwardly toward the slide 10, the slide 10 will be advanced the precise stepping increment by reason of engagement of the plunger 22 with the depression 14b. The plunger 22 will be guided into the depression 14b by reason of the truncated selector surface 48 formed thereon which will engage the land 20a and will function in the same manner as did the plunger 24. When the plunger 22 is seated fully within the selected depression 14a the vertical axis of the plunger 24 will again be in intersecting relation with the next succeeding land 20c. By continued alternating movement of the plungers 22, 24 the slide 10 will be advanced at regular and precise dimensional intervals along the direction 49.

Figure 6:
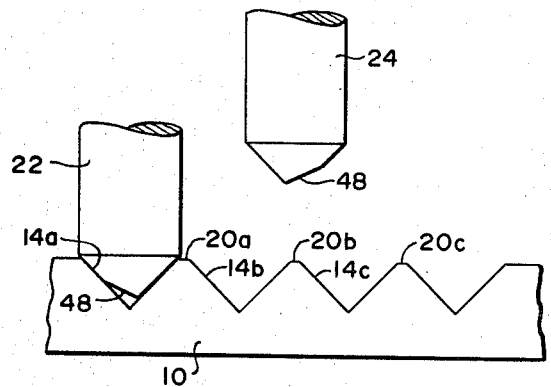
FIG. 6 is an illustration similar to that of FIG. 2 in which the selector surface of one plunger is reversed to provide an oscillatory motion.

Although my invention has been described thus far as providing an incremental stepping motion in a single, linear direction, it should be understood that it may be employed to provide incremental stepping motion in other directions. In this regard it should be noted that the orientation of the selector surface 48 on the downwardly moving plunger determines which of the depressions 14 will be wedged into engagement with the downwardly moving plunger. Thus, in the illustrative embodiment of my invention described above, all of the selector surfaces 48 are disposed on the same side of their associated plungers and in the same orientation thereon. This arrangement insures that each downwardly moving plunger will be wedged into the next succeeding depression 14 so that each incremental step will be along the same direction. If, for example, the selector surface 48 of the plunger 24 is reversed, as shown in FIG. 6, when that plunger is urged downwardly toward the slide it will be guided toward the preceding depression 14b whereupon continued downward movement of the plunger 24 will cause the slide 10 to reverse its direction of movement and to back up a distance equal to one increment. This arrangement may be employed to reciprocate the slide 10 back and forth between a pair of selected positions.

For the sake of clarity and ease of explanation, the foregoing description of my invention has related to an arrangement in which only two plungers are employed to impart the incremental stepping motion to the slide. Although this arrangement is satisfactory to provide a regular incremental stepping motion in which the slide is advanced one increment in the same or a reversed direction for each stroke of the plungers, there may be instances in which it is desirable to provide a different, more complex, pattern of incremental steps. For example, it may be desirable to index the slide 30 so that it initially makes three incremental steps in one direction, then reverses for two incremental steps and then advances for any desired number of incremental steps, etc. Any other pattern may be desirable for a particular indexing operation. The sequential indexing may be varied in this manner by providing a plurality of plungers positioned over the depressions, the operation of the plungers being controlled so that at any given time only one of the plungers will be moving downwardly toward and into engagement with the slide, the other plungers being controlled simultaneously so that when the downwardly moving plunger engages the slide, the slide will be free to move in response to the downwardly moving plunger. The sequence of operation of the plungers should be chosen so that the axis of the downwardly moving plunger is in alignment with one of the lands 20 or, in other words, is misaligned with respect to the depression 14 into which it will be urged. Additionally, the selector surface 48 of that downwardly moving plunger should be disposed on the lower face of the plunger to engage the selected depression which will produce the incremental step in the desired direction.

This arrangement is shown in FIG. 7 in which the slide 10 is provided with equally spaced depressions 14a, 14b, 14c, 14d, 14e and 14f. In addition to the plungers 22 and 24, plungers 22a and 24a are provided, which are aligned with the plungers 22, 24 and the depressions in the slide 10. The plungers 22a, 24a are identical to the plungers 22 and 24 except that the truncated selector surfaces 48 are in a reversed orientation. The spacing between the plungers 22 and 22a is equal to an even multiple of the stepping increment and the spacing between the plungers 24, 24a similarly is equal to an even multiple of the stepping increment. The magnitude of the space between each of the plungers 22, 22a, and the plungers 24, 24a is, however, equal to an odd multiple of the desired stepping increment. Thus, as shown at FIG. 7, when the plunger 22 is seated and in alignment with the depression 14a, the plunger 22a similarly will be in alignment with the depression 14d. The plungers 24, 24a, however, will be displaced and misaligned with respect to the depressions, the axis 30 of the plunger 24 being in alignment with the land 20b and the axis 30a of the plunger 24a being in alignment with the land 20e. If it is desired to advance the slide a number of increments along the direction 49, the plunger 24, is next urged downwardly so that its selector surface 48 will engage the land 20b to guide the plunger into the depression 14c and advance the slide 10 one increment along the direction 49. Simultaneously, the plunger 22 would be raised so that after the slide 10 has been advanced, the axis 28 of the plunger 22 will be in alignment with the land 28. The operation of the plungers 22, 24 may be alternated in this manner to advance slide 10 any number of incremental steps in the direction 49. At any given time, the plungers 22a, 24a may be operated to reverse the movement of the slide 10 along the direction indicated by the arrow 50. Thus, if it is desired to reverse the motion of the slide 10 along the direction 50, the plunger 24a, will be urged downwardly toward the slide while the plunger 22 is retracted upwardly and out of the depression 14a. The selector surface 48 of the plunger 24a will guide that plunger into the depression 14e thereby reversing the slide 10 an incremental distance along the direction 50. Once the plunger 24a is seated fully within the depression 14e, the plungers 22 and 22a will be in alignment with the lands 20f and 20c, respectively. Thus if it is desired to continue the incremental movement in the direction 50, the plunger 22a is next operated. If, it is desired again to reverse the direction of movement of the slide along the direction 49, the plunger 22 will be operated to enable the selector surface 48 to guide it into wedging engagement with the depression 14a. From the foregoing it will be appreciated that any sequential pattern of incremental steps may be obtained by selecting properly the sequence of operation of the plungers.

A pair of indexing mechanisms, as described heretofor, may be employed to provide an incremental stepping motion in mutually perpendicular directions along a common plane to provide an X–Y pattern of movement. This may be accomplished by connecting a pair of indexing members 10, arranged for movement in perpendicular directions, to the member to be indexed, such as a table for supporting a workpiece or an operating head of a machine. A group of plungers is associated with each indexing member to drive each indexing member 10 in a sequence to produce the stepping increments in the desired X–Y pattern.

My invention may be employed further to provide incremental rotary movement. For example, as shown in FIG. 8, a rotary table 54 may be substituted for the slide 10 and may have a plurality of depressions 14 arranged in a circular pattern. A pair of parallel cones 22, 24 similar to those shown in FIG. 1 may be provided to engage alternately the depressions on the table to advance the table about its axis of rotation to provide the desired angular incremental steps. The plungers may be arranged to provide rotational incremental stepping in both an advancing and a reversed direction by providing selector surfaces 48 with the desired orientation as described above. Additional plungers may be provided in the same manner as described above with reference to FIG. 7 to vary the pattern and the direction of sequencing. For example, the table may be rotated three incremental steps in one direction, then reversed two steps and then advanced one step, etc.

An alternative rotary incremental stepping arrangement is shown in FIG. 9 from which it will be seen that the depressions 14 are formed at the edge of a wheel or plate 56 and the plungers 22, 24 are mounted for movement along nonparallel axes 58, 60 that intersect the axis rotation 60 of the wheel 56. This arrangement may be modified to provide more complex motions and sequences in the same manner as set forth above in connection with the other stepping arrangements.

From the foregoing it will be appreciated that I have provided an incremental stepping device of simple and uncomplicated design, which employs few moving parts yet which is effective to produce highly accurate and precise results. Additionally, the device may be adapted to provide a wide variety of stepping patterns.

Although my device has been described primarily as being employed to index a member in connection with a manufacturing process such as drilling, punching, etc., it should be understood that my invention may be employed in any environment in which it is desirable to impart precise incremental motion to a given member. For example, as shown diagrammatically in FIG. 10, the invention may be used to engage or disengage a clutch 62 with a flywheel 64. The clutch 62 is mounted for movement toward and away from the flywheel 64 along the axis 66. The clutch is rotatably supported within a yoke 68 having a pair of depressions 72, 74 formed at its outer surface and which are associated with a pair of plungers 76, 78, respectively. The plungers are provided with reversed selector surfaces, such as shown in FIG. 6, so that the yoke 68, and clutch 62 may be urged toward or away from the flywheel 64 in response to movement of the plungers 76, 78.

Additionally, in the illustrative embodiments of my invention, the facing surface of the plungers or drive members have been described as being of conical contour to cooperate with conically shaped depressions formed in the slide. Although the conical form is preferred, other contours, tapered to provide a wedging effect to advance the slide, may be employed. For example, the depressions and their associated facing surfaces on the plungers may take the form of an inverted pyramid. Thus, it will be understood that the foregoing description of my invention is intended merely to be illustrative and that other embodiments and modifications thereof will be apparent to those skilled in the art without departing from its spirit.

Having thus described my invention, what I desire to secure and claim by Letters Patent is:

1. A precision incremental stepping device comprising:

an indexing member mounted for movement along a predetermined path, said indexing member having at least one depression formed thereon, said depression being defined by a surface which is disposed at an angle to said path of movement;

a plunger having a facing surface of substantially complementary contour to that of said depression to enable said facing surface to be seated snugly within said depression;

means mounting said plunger for movement that is toward and away from said indexing member in a direction to enable said facing surface to be seated snugly within said depression when said plunger and depression are in alignment;

means for positioning said plunger and said indexing member so that said plunger is misaligned with respect to said depression, said misalignment being of a magnitude such that when said plunger is moved toward said indexing member, the facing surface of said plunger will contact the surface of said depression in a noncomplementary disposition, said complementary surfaces of said plunger and depression being arranged to generate a wedging effect so that as said movement of said plunger is continued toward said indexing member, said indexing member will advance an incremental step in response to said wedging effect until said plunger is seated fully within said depression, the magnitude and direction of said incremental step being equal to the magnitude and direction of said misalignment of said plunger and depression, and said means for positioning said plunger and said indexing member in misalignment including a second depression formed on said indexing member and spaced from said first depression by a predetermined distance, and a second plunger having a facing surface complementary to that of said second depression to enable said second plunger to be seated in complementary engagement with said second depression, and having the magnitude of spacing between said first and second plungers differing from the spacing between said first and second depressions by an amount equal to the desired increment by which said indexing member is to be advanced, whereby when said second plunger is fully seated within said second depression said first plunger and said first depression will be in said misaligned orientation.

2. A precision incremental stepping device comprising:

an indexing member mounted for movement along a predetermined path, said indexing member having at least one depression formed thereon, said depression being defined by a surface which is disposed at an angle to said path of movement;

a plunger having a facing surface of substantially complementary contour to that of said depression to enable said facing surface to be seated snugly within said depression;

means mounting said plunger for movement that is toward and away from said indexing member in a direction to enable said facing surface to be seated snugly within said depression when said plunger and depression are in alignment;

means for positioning said plunger and said indexing member so that said plunger is misaligned with respect to said depression, said misalignment being of a magnitude such that when said plunger is moved toward said indexing member, the facing surface of said plunger will contact the surface of said depression in a noncomplementary disposition, said complementary surfaces of said plunger and depression being arranged to generate a wedging effect so that as said movement of said plunger is continued toward said indexing member, said indexing member will advance an incremental step in response to said wedging effect until said plunger is seated fully within said depression, the magnitude and direction of said incremental step being equal to the magnitude and direction of said misalignment of said plunger and depression, and said means for positioning said plunger and said indexing member in misalignment including a second depression formed on said indexing member adjacent to but spaced from said first depression and identical thereto with said misalignment of said plunger being such that said plunger is disposed between said adjacent depression so that said plunger is misaligned equally with respect to said depressions; and selector means on said plunger for guiding said plunger into a selected one of said adjacent depressions.

3. A device as defined in claim 1 wherein said facing surfaces of said plungers and said depressions are of conical contour.

4. A device as defined in claim 1 wherein said facing surfaces of said plungers and said depressions are of conical contour.

5. A device as defined in claim 2 wherein said selector means comprises:

said facing surface having a selector surface formed thereon, said selector surface being disposed in a plane that is at an angle to said direction of plunger movement, said selector surface being oriented on said plunger to guide said plunger into said selector depression.

6. A device as defined in claim 5 wherein said facing surface of said plunger and said depression are of conical contour; and wherein said selector surface comprises a truncated surface formed on the tip of said facing surface.

7. A precision incremental stepping device comprising:

an indexing member mounted for movement along a predetermined path, said indexing member having a plurality of identical depressions formed along a surface thereof, said depressions being spaced at equal and regular intervals along said surface, each of said intervals being equal to twice that of the desired stepping increment;

a first plunger located along an axis that intersects said surface of said indexing member and is normal to said surface at the point of intersection;

a second plunger located along a second axis that intersects said surface of said indexing member and is normal to said surface at the point of intersection;

said first and second axes being spaced in line with said depressions and at an interval that is equal to an odd multiple of said stepping increment, said odd multiple being greater than said even multiple at which said depressions are spaced so that when one of said axes is in alignment with one of said depressions, the other of said axes will intersect said indexing member between a selected pair of adjacent depressions, each of said plungers having a facing surface which complements substantially the contour of said depressions, said facing surfaces being disposed centrally along the axis of its respective plunger so that when the facing surface of one of said plungers is in complementary engagement with a selected one of said depressions, the facing surface of the other of said plungers will be disposed between said selected pair of depressions;

means mounting each of said plungers for alternating movement along their respective axes, in a direction that is toward and away from said surface of said indexing member so that when one of said plungers, which was in complementary engagement with one of said depressions, is withdrawn from said depression, the other of said plungers will move toward said indexing member along its axis; and selector means for guiding the downwardly moving plunger into a predetermined one of said selected pair of depressions so that as said advancing plunger moves into said predetermined depression, said indexing member will advance along its direction of movement until said facing surface of said advancing plunger is in full complementary engagement with said predetermined depression.

8. An incremental stepping device as defined in claim 7 wherein said indexing member is mounted for movement in a horizontal plane and wherein said axes of said first and second plungers are disposed vertically.

9. An incremental stepping device as defined in claim 7 wherein said facing surfaces of said plungers and said depressions formed in said indexing member are of conical contour so that after said selector means has been effective to guide the downwardly moving plunger toward said predetermined one of said selected pair of depressions, continued downward movement of said plunger to seat said plunger in said selected depresssion will impart a wedging action to said indexing member thereby advancing said indexing member by said increment.

10. An incremental stepping device as defined in claim 9 wherein said selector means comprises:

each of said conical facing surfaces of said plungers being truncated to define a selector surface, each of said selector surfaces being oriented on its respective plunger to guide selectively that plunger into the desired depression.

11. A device as defined in claim 9 wherein all of said selector surfaces are oriented on their respective plungers to advance said indexing member in a single direction.

12. A device as defined in claim 9 wherein some of said selector surfaces are oriented on their respective plungers to advance said indexing member in one direction and wherein the remaining of said selector surfaces are oriented on their respective plungers to advance said indexing member in a reverse direction.

13. An incremental stepping device as defined in claim 7 wherein said indexing member comprises a rotary member mounted for rotation about an axis, said depressions being formed circumferentially about the edge of said rotary indexing member, said depressions having axes which intersect at said axis of rotation; and said axes of said plungers being angularly spaced apart and intersecting said axis of rotation, said plungers being disposed along their respective axes radially and outwardly of said rotary indexing member.

14. An incremental stepping device as defined in claim 7 wherein said indexing member comprises a table mounted for rotation about an axis, said depressions being circumferentially spaced about a face of said rotary table;

said axes of said plungers being disposed in parallel relation to each other and to said axis of rotation of said table.

15. A precision incremental stepping device comprising:

an indexing member mounted for movement along a predetermined path, said indexing member having a plurality of identical depressions formed along a surface thereof, said depressions being spaced at predetermined intervals along said surface;

an array of plungers mounted in spaced relation to said surface of said indexing member, each of said plungers being movable along an axis that intersects said surface and is normal thereto at the point of intersection, each of said plungers having a facing surface which complements substantially the contour of said depressions, said facing surfaces being disposed centrally along the axis of its respective plunger;

means spacing said plungers in said array so that when the axis of one of said plungers is in registry with a selected depression, another, selected plunger will be in misalignment with another selected one of said depressions, so that when said another selected plunger is moved along its axis toward said another selected depression, it will engage the surface of another selected depression, said surfaces of said plunger and said depression being contoured to effect a wedging action when said another plunger is urged toward said misaligned another depression, so that when said another selected plunger is urged downwardly into full seating engagement with said another selected depression said indexing member may be advanced, in response to said wedging action, in an increment equal to the magnitude of said misalignment, said incremental movement of said indexing member causing an additional one of said depressions to be indexed into misalignment with an additional plunger; and means enabling the sequence of movement of said plungers toward said indexing member to be controlled so that the selected, misaligned plunger is moved toward said indexing member at the desired time.

16. An incremental stepping device as defined in claim 15 wherein the spacing of said depressions on said indexing member is such that the axis of said selected misaligned plunger is disposed intermediate a pair of said depressions, said device further comprising:

selector means for guiding the downwardly moving plunger into one of said pairs of depressions.

17. An incremental stepping device as defined in claim 16 wherein said depressions and facing surfaces of said plungers are of conical shape.

18. An incremental stepping device as defined in claim 17 wherein said selector means comprises:

said conical facing surface of said plungers being truncated to define a selector surface oriented to guide said downwardly moving plunger into said predetermined one of said pair of depressions.

References Cited
UNITED STATES PATENTS

| | | | |
|---|---|---|---|
| 1,517,681 | 12/1924 | Lucey | 74—110X |
| 2,941,424 | 6/1960 | Dixon | 74—88X |

FRED C. MATTERN, Jr., Primary Examiner

F. D. SHOEMAKER, Assistant Examiner

U.S. Cl. X.R.

74—817

UNITED STATES PATENT OFFICE
CERTIFICATE OF CORRECTION

Patent No. 3,552,220            Dated January 5, 1971

Inventor(s) Donald E. MacDermod

It is certified that error appears in the above-identified patent and that said Letters Patent are hereby corrected as shown below:

Column 2, line 17, "are" should be --is--.

Column 2, line 59, "is" should be --in--.

Column 8, line 34 (Claim 4), "claim 1" should be changed to --claim 2--.

Signed and sealed this 28th day of September 1971.

(SEAL)
Attest:

EDWARD M. FLETCHER, JR.          ROBERT GOTTSCHALK
Attesting Officer                   Acting Commissioner of Patent